Feb. 4, 1947. F. B. HOOPER 2,415,099
SCUPPER VALVE REMOTE CONTROL MECHANISM
Filed Oct. 19, 1943
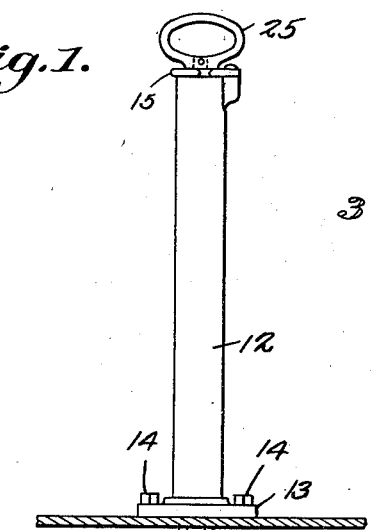
Fig.1.
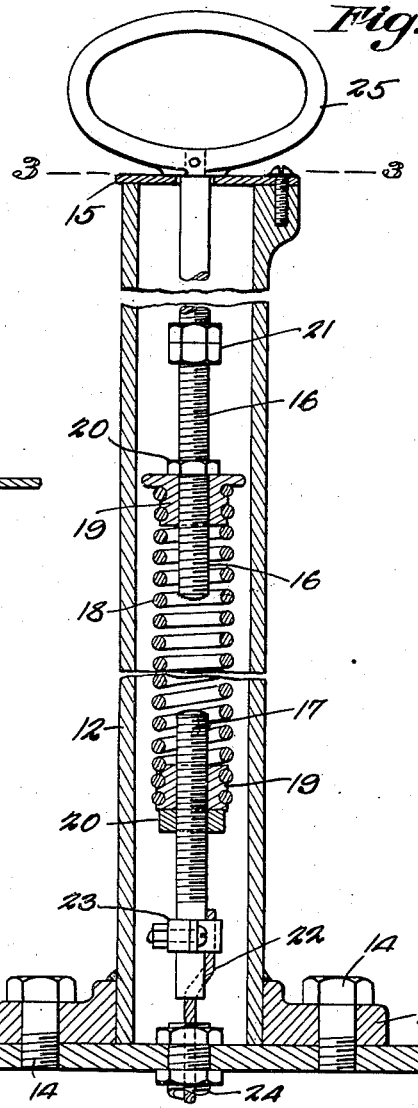
Fig.2.
Fig.3.
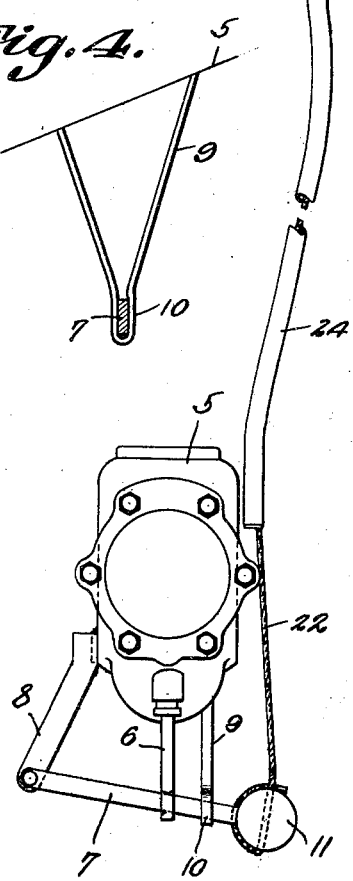
Fig.4.
F. B. Hooper INVENTOR.
BY Knowles.
ATTORNEYS.

Patented Feb. 4, 1947

2,415,099

UNITED STATES PATENT OFFICE 2,415,099

SCUPPER VALVE REMOTE CONTROL MECHANISM

Frank B. Hooper, Newport News, Va.

Application October 19, 1943, Serial No. 506,900

1 Claim. (Cl. 74—502)

This invention relates to scupper valve remote control mechanism, the primary object of the invention being to provide means whereby the ball valve member of a scupper valve, may be manually moved and held in its closed position, should it become necessary to maintain the valve closed for a predetermined period.

An important object of the invention is to provide remote control means for scupper valves, to the end that scupper valves, equipped with operating devices such as embodied in the present invention, may be closed and opened from points remote from the valves, or from a valve control station, common to all of the scupper valves of a vessel.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Fig. 1 is an elevational view illustrating a scupper valve control mechanism constructed in accordance with the invention, as connected with a scupper valve.

Fig. 2 is a longitudinal sectional view through the tube in which the control rod of the operating mechanism, is mounted.

Figure 3 is a sectional view taken on line 3—3 of Fig. 2.

Fig. 4 is an elevational view of the weighted arm and guide within which the weighted arm moves.

Referring to the drawing in detail, the reference character 5 designates a scupper valve of the hollow ball type, the valve seat being disposed adjacent to the upper end of the valve 5, so that the ball valve may float to its seat, and close the valve, under normal operating conditions.

The reference character 6 indicates a pushrod that extends through the bottom of the valve 5, and is so disposed that the end of the rod within the valve housing, will be in direct alignment with the ball valve. The rod 6 is provided with an opening, through which the arm 7 extends, the arm 7 being pivotally connected to the bracket 8 that is welded to the side of the valve housing 5, as shown by Fig. 1 of the drawing.

A substantially V-shaped guide member 9 is secured at the lower end of the valve housing 5, and is provided with a restricted portion 10 which is of a width slightly greater than the width of the arm 7, so that the arm 7 may fit therein and be held in position by frictional contact with the walls of the restricted portion. Thus it will be seen that due to this construction, the arm 7 will be securely held against lateral movement. The weight 11, which is formed on the free end of the arm 7 will normally urge the arm 7 into the restricted portion of the guide member 9.

The tubular housing 12 also forms a part of the remote control valve operating mechanism, and is provided with a flange 13 at its lower end, which may be secured to the tubular housing by any suitable means such as by welding, as shown. This flange 13 is formed with bolt openings, through which the bolts 14 extend so that the housing may be secured to the deck of a ship, or to a support of the valve control room, in which the housing may be located.

The upper end of the housing is closed by means of the pivoted closure 15 that is provided with an elongated curved opening extending inwardly from the edge thereof, as shown by Fig. 3 of the drawing.

The control rod operates within the housing 12, and embodies an upper threaded section 16, and a lower threaded section 17, the sections 16 and 17 of the control rod, being held together, by means of the coiled spring 18, yieldably connecting the sections. The ends of the coiled spring are mounted in grooves formed in the peripheries of the nuts 19, that are held in their positions of adjustment on the sectional control rod, by means of the nuts 20. Nuts 21 are also mounted on the section 16 of the control rod, and are adapted to move with the control rod, to positions above or beyond the upper end of the housing 12, so that when it is desired to hold the control rod in a set position, the closure 15 may be moved to a position under the nuts 21, when the control rod has been pulled. The tension of the spring will draw the control rod inwardly and set up a binding action between the nuts 21 and closure 15.

The operating cable is indicated by the reference character 22, and extends through a bore formed in one end of the section 17 of the control rod, there being provided a clip 23 that clamps the cable to the section 17 of the control rod.

The operating cable moves through the conduit 24 which may be positioned or installed, in such a way as to insure against binding of the cable within the conduit. It might be further stated that the operating cable will be supplied with a coating of grease before being threaded through the conduit, to insure a smooth operation of the cable.

The cable is secured to the ball 11, by passing one end of the cable through a bore formed in the ball, and securing the end exteriorly of the ball, as shown.

An operating handle indicated at 25, is removably secured to the outer end of the section 16 of the control rod, so that the operator may, by grasping the handle, pull the rod to operate the cable as described. Because of the yieldable connection between the sections 16 and 17 of the control rod, it will be obvious that regardless of the strain which may be directed to the mechanism, when pulling the control rod, the mechanism will not be damaged, since the coiled spring will act as a shock absorber.

From the foregoing it is believed that the operation of the remote control mechanism for scupper valves will be obvious, and that further detail description of the device is unnecessary.

What is claimed is:

A device of the class described, comprising a stationary tubular housing, a sectional control rod operating through the housing, a contractile spring connecting the sections of the control rod, a cable connected with one end of the rod, the opposite end of the rod being extended through one end of the housing, a handle on the end of the rod extending through the end of the housing, a pivoted closure in the form of a disk having a curved opening, adapted to close one end of the housing, said opening adapted to receive the control rod when the closure is moved to its closed position, and said disk closure providing a stop against which the handle of the rod engages.

FRANK B. HOOPER.

REFERENCES CITED

The following references are of record in the file of this patent:

UNITED STATES PATENTS

| Number | Name | Date |
| --- | --- | --- |
| 1,085,245 | Cowdrey | Jan. 27, 1914 |
| 1,488,042 | Gonsouland | Mar. 25, 1924 |
| 2,007,569 | Hoke | July 9, 1935 |
| 471,523 | McElory | Mar. 22, 1892 |
| 1,214,700 | Marks | Feb. 6, 1917 |
| 1,628,506 | Lyman | May 10, 1927 |
| 987,760 | Spellings | Mar. 28, 1911 |
| 2,331,760 | Botner | Oct. 12, 1943 |
| 836,811 | Kennebrew | Nov. 27, 1906 |
| 2,234,082 | Pace | Mar. 4, 1941 |

FOREIGN PATENTS

| Number | Country | Date |
| --- | --- | --- |
| 9,349 | British | June 2, 1891 |
| 648,086 | French | Aug. 7, 1928 |